United States Patent [19]

Urs et al.

[11] Patent Number: 5,711,011
[45] Date of Patent: Jan. 20, 1998

[54] METHOD FOR PROVIDING VOICE MAIL SERVICE IN A DISPATCH RADIO COMMUNICATION SYSTEM AND CORRESPONDING DISPATCH SYSTEM

[75] Inventors: Kamala D. Urs, Bartlett; Daniel J. Coombes, Glen Ellyn; Valy Lev, Buffalo Grove, all of Ill.

[73] Assignee: Motorola, Inc., Schaumburg, Ill.

[21] Appl. No.: 659,096

[22] Filed: Jun. 4, 1996

[51] Int. Cl.$^6$ ............................... H04B 7/00; H04Q 7/20
[52] U.S. Cl. ...................... 455/520; 455/413; 455/521; 379/89
[58] Field of Search ...................... 455/66, 95, 412, 455/413, 414, 415, 510, 514, 517, 518, 520, 521; 379/89, 88, 67, 202, 203, 204, 210, 211, 212; 370/259, 260, 261

[56] References Cited

U.S. PATENT DOCUMENTS

| | | | |
|---|---|---|---|
| 5,416,770 | 5/1995 | Stoner et al. | 455/518 |
| 5,418,835 | 5/1995 | Frohman et al. | 455/413 |
| 5,557,605 | 9/1996 | Grube et al. | 455/415 |
| 5,570,414 | 10/1996 | Stern | 379/89 |

*Primary Examiner*—Chi H. Pham
*Assistant Examiner*—Gertrude Arthur
*Attorney, Agent, or Firm*—Daniel C. Crilly

[57] ABSTRACT

A dispatch radio communication system (100) that includes a dispatch processor (101) and a voice mail system (103) employs a method and apparatus for providing voice mail service in the dispatch system. The dispatch processor receives a request to communicate from a first communication unit (109), wherein the request includes a dispatch identification (ID) of a second communication unit (110) that is a target of a communication from the first communication unit. The dispatch processor then determines whether the second communication unit can participate in the communication. When the second communication unit cannot participate, the dispatch processor establishes a communication path (122, 126) between the first communication unit and a third communication unit (111) that is coupled to the voice mail system to allow a user of the first communication unit to provide a voice mail message to the voice mail system for a user of the second communication unit.

27 Claims, 3 Drawing Sheets

METHOD FOR PROVIDING VOICE MAIL SERVICE IN A DISPATCH RADIO COMMUNICATION SYSTEM AND CORRESPONDING DISPATCH SYSTEM

FIELD OF THE INVENTION

The present invention relates generally to dispatch radio communication systems and, in particular, to providing voice mail service in a dispatch radio communication system.

BACKGROUND OF THE INVENTION

Voice mail service is well known in standard and cellular telephone systems. With such a service, one user can leave an audio message for another user when the other user is not available for some reason (e.g., is currently talking on the telephone or is physically not present to answer the telephone). In one typical scenario, a cellular telephone user makes a cellular telephone call to a telephone subscriber of the public switched telephone network (PSTN). When the PSTN subscriber is currently on the telephone and has purchased the voice mail service option from the local telephone service company, the call is transferred to a voice mail system together with a voice mailbox identification of the PSTN subscriber (typically the PSTN subscriber's telephone number). Upon receiving the call, the voice mail system retrieves the PSTN subscriber's audio prompt message from memory and conveys the prompt message to the caller. In response to the prompt message, the caller transmits an audio message which is stored by the voice mail system in a memory location associated with the PSTN subscriber. When the PSTN subscriber eventually decides to check his or her voice mail messages, the PSTN subscriber simply calls the voice mail system and instructs the voice mail system (usually via telephone keypad entries) to retrieve and play the stored message.

In another typical scenario, a PSTN subscriber makes a telephone call to a cellular telephone user. When the cellular telephone user is currently unable to answer the call and has purchased the voice mail service option from the local cellular telephone service provider, the call and a voice mailbox identification of the cellular subscriber (typically the cellular subscriber's telephone number) are transferred within the cellular system infrastructure to a voice mail system coupled to the cellular system infrastructure. Upon receiving the call, the voice mail system retrieves the cellular subscriber's audio prompt message from memory and conveys the prompt message to the caller via the cellular infrastructure. In response to the prompt message, the caller transmits an audio message which is stored by the voice mail system in a memory location associated with the cellular subscriber. When the cellular subscriber eventually checks his or her voice mail messages, the cellular subscriber simply calls the voice mail system and instructs the voice mail system to retrieve and play the stored message. In the above-described ways, voice mail allows cellular and PSTN users to receive messages that they would otherwise not be able to receive. Thus, voice mail is a very powerful communication feature in today's fast-paced world.

In contrast to cellular telephone systems, dispatch radio systems do not have access to the PSTN for dispatch calls. In dispatch communication systems, mobile radio communication units are organized into talk groups that typically share a communication resource, or channel, when participating in a group call, or communication. When a group call is desired, one of the group members transmits a request for a group call to a dispatch processor and the dispatch processor instructs all talk group members to monitor a particular channel to receive the upcoming call. In addition to group calls, dispatch systems also provide for private calls between two mobile communication units only. When a private call is desired, the originator of the call transmits a request for a private call to the dispatch processor. The dispatch processor then attempts to contact the target unit of the call. When the target is not available, the dispatch processor simply conveys a target unavailable message (e.g., target busy message) to the call originator because the dispatch processor has no connection to the PSTN through which to route the originator's call to a voice mail system. Consequently, the target user has no knowledge that he or she was the target of a private call. Furthermore, if the call originator needs to contact the target user, the call originator must continue to re-request private calls in the hope that one of the requested calls can be completed.

Therefore, a need exists for a method of providing voice mail service in a dispatch radio communication system. A dispatch radio communication system that provides such a service would be a substantial improvement over the prior art.

DESCRIPTION OF A PREFERRED EMBODIMENT

Generally, the present invention encompasses a method and apparatus for providing voice mail service in a dispatch radio communication system that includes a dispatch processor and a voice mail system. The dispatch processor receives a request to communicate from a first communication unit, wherein the request to communicate includes a dispatch identification (ID) of a second communication unit that is a target of a communication from the first communication unit. Upon receiving the request, the dispatch processor determines whether the second communication unit can participate in the communication with the first communication unit. When the second communication unit cannot participate in the communication, the dispatch processor establishes a radio communication path between the first communication unit and a third communication unit that is coupled to the voice mail system to allow a user of the first communication unit to provide a voice mail message to the voice mail system for a user of the second communication unit. By providing voice mail service in this manner, the present invention allows users of mobile communication units in dispatch radio systems to enjoy the benefits of voice mail, a service currently provided only in wireline and cellular telephone networks.

Figure 1:
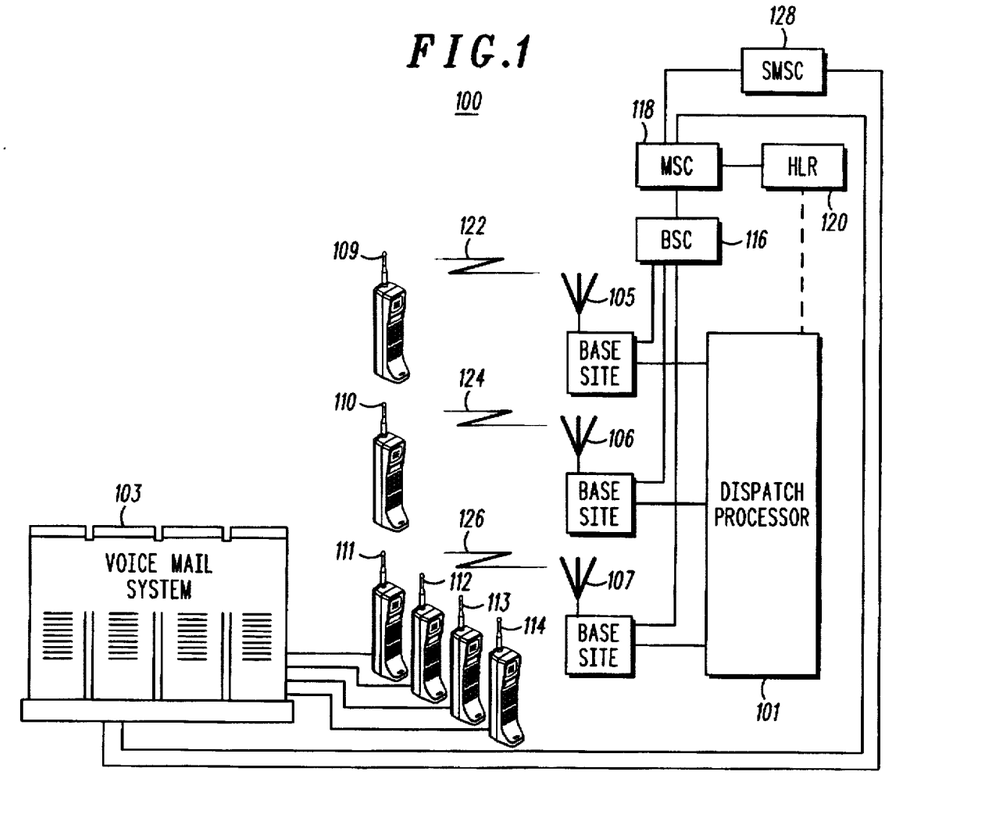
FIG. 1 illustrates a block diagram of an exemplary dispatch radio communication system that provides voice mail service in accordance with the present invention.
Figure 2:
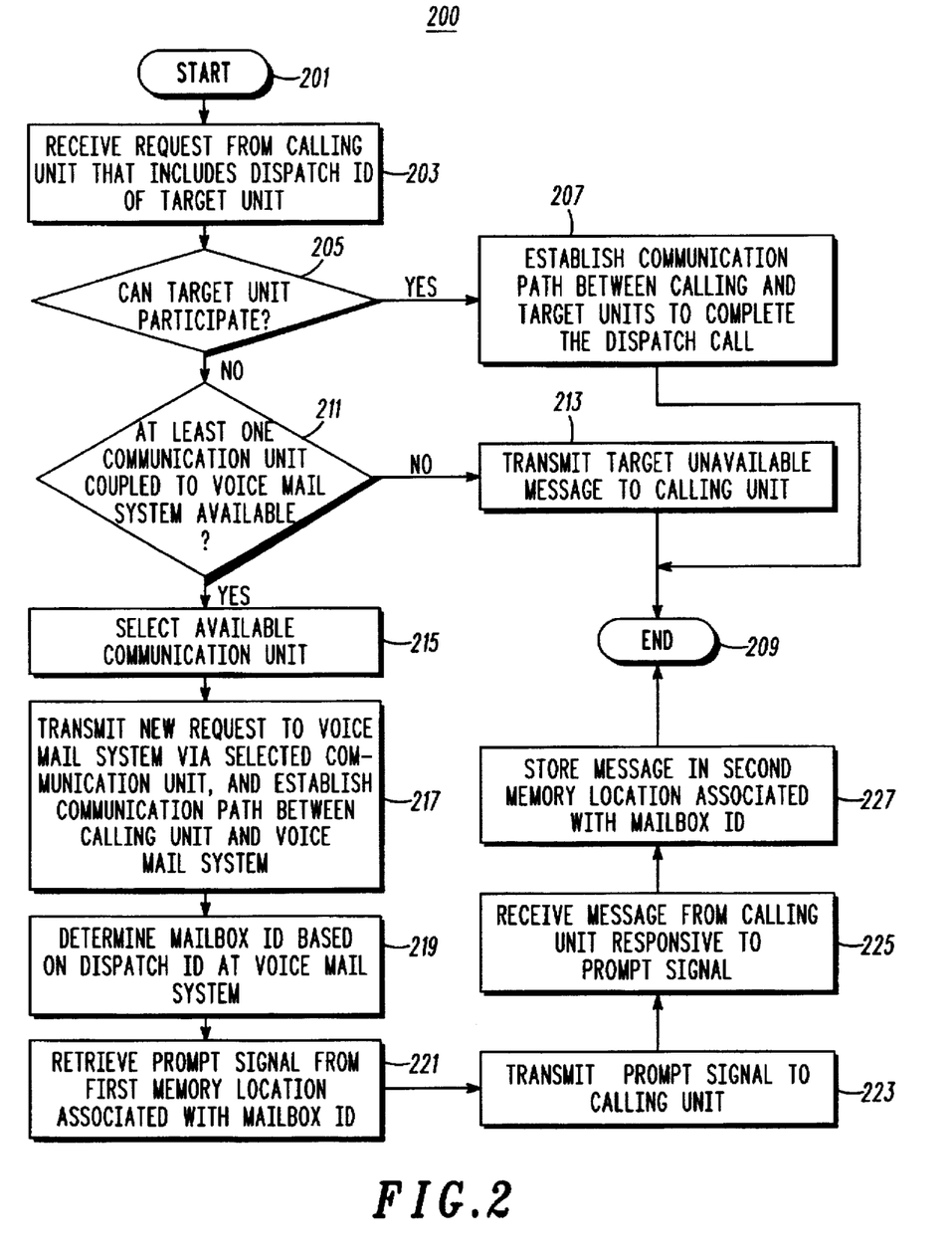
FIG. 2 illustrates a logic flow diagram of steps executed to provide voice mail service in a dispatch radio communication system in accordance with a preferred embodiment of the present invention.
Figure 3:
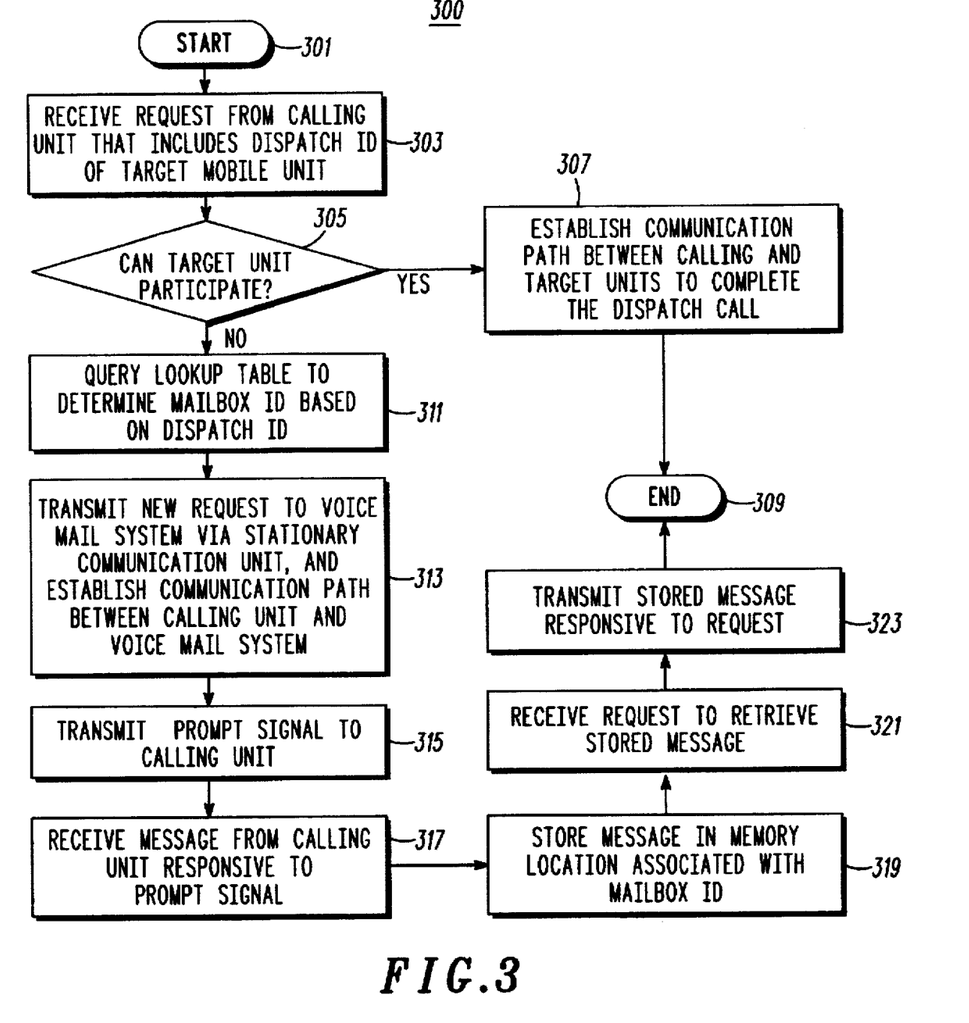
FIG. 3 illustrates a logic flow diagram of steps executed to provide voice mail service in a dispatch radio communication system in accordance with an alternative embodiment of the present invention.

The present invention can be more fully understood with reference to FIGS. 1–3. FIG. 1 illustrates a block diagram of an exemplary dispatch radio communication system 100 that provides voice mail service in accordance with the present invention. The dispatch communication system 100 includes a dispatch processor 101, a voice mail system 103, a plurality of base sites 105–107, a plurality of mobile radio communication units 109, 110, a group of stationary radio communication units 111–114, a base site controller (BSC) 116, a mobile switching center (MSC) 118, and a home location register (HLR) 120. The dispatch processor preferably comprises an "iDEN" Dispatch Application Processor that is commercially available from Motorola, Inc. The voice mail system comprises a well-known telephone voice mail system that has been modified with software and hardware to facilitate connection to, and control of, the group of stationary radio communication units 111–114.

The radio communication units 109–114 preferably comprise two-way communication devices, such as mobile or portable radios or radiotelephones. However, the stationary radio communication units 111–114 remain at a fixed location and are coupled to the voice mail system, for example, via RS-232 ports; whereas, the mobile radio communication units are free to be moved to various locations throughout the system 100 as desired by their respective users. The BSC 116 preferably comprises an "iDEN" Base Site Controller that is commercially available from Motorola, Inc. The base sites 105–107 are well known in the art and preferably support one or more trunking communication platforms, such as frequency division multiple access (FDMA), time division multiple access (TDMA), or code division multiple access (CDMA). In a preferred embodiment, the base sites 105–107 comprise "iDEN" Enhanced Base Transceiver Sites, which are also available from Motorola, Inc. The MSC 118 preferably comprises a DMS-MSC cellular telephone switch and the HLR 120 preferably comprises a DMS-HLR Home Location Register, both of which are manufactured by Northern Telecom, Inc. The HLR 120 includes one or more databases or lookup tables that store mobile unit registrations and identifications (IDs), and that associate system services with the respective mobile IDs. Although shown external to the dispatch processor 101 in FIG. 1, the HLR 120, or portions thereof, may actually reside within the dispatch processor 101 in accordance with the invention.

Operation of the exemplary dispatch radio communication system in accordance with the present invention occurs substantially as follows. When a mobile radio communication unit (e.g., 109) desires to engage in a private communication, or call, with another mobile radio communication unit in either the same or a different talk group, the communication unit 109 transmits a request to communicate to its serving base site 105 over a control channel, or resource, in accordance with well-established techniques. The request to communicate includes the dispatch IDs of both the requesting communication unit 109 and the communication unit (e.g., 110) that is the intended target of the desired communication, and identifies each communication unit as either requester or target in accordance with known techniques. Upon receiving the request at the base site 105, the base site 105 provides the request to the dispatch processor 101. The dispatch processor 101 queries a location database either within the dispatch processor 101 or external to the dispatch processor 101 to determine which location area currently contains the target communication unit 110 (i.e., to determine the communication unit's approximate location). As is known, a location area is a geographic area containing service coverage areas of one or more base sites. For the purposes of this discussion, it is assumed that the service coverage areas of base sites 105–107, and the base sites 105–107 themselves, are located in one location area.

Once the dispatch processor 101 locates the target communication unit 110, the dispatch processor 101 attempts to contact the target communication unit 110 to determine whether the target unit 110 can participate in the requested private call. To make this determination, the dispatch processor 101 transmits a page to the target unit 110 over the control channels of each base site 105–107 serving the location area containing the target unit 110. When the target unit 110 responds to the page within a certain period of time (e.g., five seconds), the dispatch processor 101 determines the base site 106 that is serving the target unit 110 (i.e., the base site 106 that received the response to the page) and also determines that the target communication unit 110 can participate in the call. The dispatch processor 101 then establishes a communication path between the requesting communication unit 109 and the target communication unit 110 to support the call. The communication path is preferably established by instructing each base site 105, 106 that is to be involved in the upcoming communication to allocate, or allocating at such base sites 105, 106, a communication resource 122, 124 (traffic channel) to support the call and allocating a resource, such as a packet routing resource, within the dispatch processor 101 itself to route the call between the base sites 105, 106. When both the target communication unit 110 and the requesting communication unit 109 are served by the same base site (e.g., base site 105), only one communication resource needs to be allocated at the serving base site 105 during the establishment of the communication path.

When the target unit 110 either does not respond to the page within a certain period of time or responds with an indication that it is busy (e.g., already involved in another private call), the dispatch processor 101 determines that the target communication unit 110 cannot participate in the requested communication. When such a condition occurs in existing dispatch systems, the dispatch processor 101 simply transmits a busy message to the requesting unit 109 via the control channel at the requesting unit's serving base site 105. By contrast, when such a condition occurs pursuant to the present invention, the dispatch processor 101 establishes a communication path between the requesting communication unit 109 and a voice mail system 103 to allow the user of the requesting unit 109 to leave a voice mail message for the user of the target unit 110 on the target user's voice mail.

Upon determining that the target communication unit 110 cannot participate in the requested call, the dispatch processor 101 determines whether a stationary communication unit 111–114 coupled to the voice mail system 103 is available to participate in a voice mail communication. In a preferred embodiment, the dispatch processor 101 consults a lookup table to determine which stationary communication unit, if any, is available to support the voice mail call. In an alternate embodiment, the dispatch processor 101 might transmit a control message to one or more of the group of stationary communication units 111–114 to determine whether a stationary unit is available. Once the dispatch processor 101 determines that a stationary unit is available, the dispatch processor 101 selects one of the available stationary units (e.g., 111) to support the voice mail call.

In a preferred embodiment, the dispatch processor 101 then generates a voice mail call request message that utilizes the dispatch IDs of the original target communication unit 110 and the selected stationary communication unit 111 to identify the original target communication unit 110 as the originator of the voice mail call request and the selected stationary communication unit 111 as the target of the voice mail call request. In addition, the voice mail call request further includes a status indicator, such as a flag or bit, that denotes whether the request is a request to store a voice mail message at the voice mail system 103 or whether the request is a request to retrieve a voice mail message from the voice mail system 103. The dispatch processor 101 transmits the voice mail call request together with a traffic channel assignment to the selected stationary communication unit 111 via a control channel at the base site 107 serving the stationary communication units 111–114. The dispatch processor 101 also transmits a traffic channel assignment to the original requesting communication unit 109 via a control channel at its serving base site 105. The dispatch processor 101 then establishes a radio communication path between the original requesting communication unit 109 and the selected stationary communication unit 111 by instructing each base site 105, 107 that is to be involved in the upcoming voice mail communication to allocate, or allocating at such base sites 105, 107, a traffic channel 122, 126 (communication resource) to support the call and allocating a packet routing resource within the dispatch processor 101 itself to route the voice mail call between the base sites 105, 107. When both the original requesting communication unit 109 and the selected stationary communication unit 111 are served by the same base site (e.g., base site 107), only one communication resource needs to be allocated at the serving base site 107 during the establishment of the communication path.

Upon receiving the voice mail call request, the selected stationary communication unit 111 forwards the request to the voice mail system 103. The voice mail system 103 preferably determines a mailbox identification (ID) for the request originator (i.e., the original target communication unit 110) based on the originator's dispatch ID. To perform this determination in the preferred embodiment, the voice mail system 103 queries a database at the voice mail system 103 that correlates dispatch IDs with mailbox IDs. Once the originator's mailbox ID is determined, the voice mail system 103 determines whether the request is a request to store or a request to retrieve a voice mail message based on the value of the status indicator. When the request is a request to store a voice mail message, as in this particular case, the voice mail system 103 preferably retrieves a prompt message from a prompt message memory location at the voice mail system 103 that is associated with the mailbox ID of the request originator 110. The prompt message preferably comprises a voice message previously stored at the voice mail system 103 by the user of the original target communication unit 110. In an alternate embodiment, the prompt message might be a canned message or preestablished tone that otherwise informs the user of the original requesting communication unit 109 that the voice mail system 103 has been contacted.

After retrieving the prompt message, the voice mail system 103 conveys a push-to-talk (PTT) message or signal to the selected stationary communication unit 111 to instruct the selected stationary communication unit 111 to obtain control of the traffic channel 126 previously assigned to it by the dispatch processor 101. The selected communication unit 111 obtains control of the traffic channel 126 by conveying the PTT signal, or some variation thereof, to the dispatch processor 101 to inform the dispatch processor 101 (and accordingly the original requesting communication unit 109) of the stationary unit's intent to transmit. Once the selected communication unit 111 has obtained control of the traffic channel 126, the voice mail system 103 transmits the prompt message to the original requesting unit 109 via the traffic channel 126 and the other elements of the radio communication path previously established by the dispatch processor 101. After the prompt signal or message has been transmitted, the voice mail system 103 conveys an end of transmission (EOT) message to the selected stationary communication unit 111 to instruct the selected stationary communication unit 111 to relinquish control of the traffic channel 126. The selected communication unit 111 relinquishes control of the traffic channel 126 by conveying the EOT message, or some variation thereof, to the dispatch processor 101 to inform the dispatch processor 101 (and accordingly the original requesting communication unit 109) of the stationary unit's intent to de-key, or stop transmitting.

Once the original requesting communication unit 109 is notified, or otherwise becomes aware, of the voice mail system's release of its traffic channel 126, the user of the original requesting communication unit 109 pushes the unit's PTT button and acquires control of its traffic channel 122. The user then transmits his or her voice mail message to the voice mail system 103 via the traffic channel 122 and the other elements of the radio communication path previously established by the dispatch processor 101. Upon receiving the voice mail message, the voice mail system 103 stores the message in a memory location associated with the mailbox ID of the original target communication unit 110. After the voice mail message has been stored, the dispatch processor 101 de-assigns the traffic channels 122, 126 and breaks down the radio communication path between the communication units 109, 111. This de-assignment may be accomplished expressly through transmission of a release message to the communication units 109, 111 or implicitly through expiration of a hang-time timer.

When the user of the communication unit 110 having the voice mailbox eventually decides to listen to his or her voice mail message (e.g., after receiving a voice mail message alert from the voice mail system 103 informing the user that a voice mail message is present for him or her at the voice mail system 103), the communication unit 110 preferably transmits a request to communicate to the dispatch processor 101 that indicates the communication unit's desire to engage in a private dispatch call with a stationary communication unit coupled to the voice mail system 103. In a preferred embodiment, the voice mail alert message is generated by the voice mail system 103 and converted into a short message at a short message service center (SMSC) 128 using known techniques. The short message alert is then conveyed to the communication unit 110 via the MSC 118 and the serving base site 106. In an alternative embodiment, the voice mail system 103 might provide the voice mail alert message in a format (such as short message service) compatible for receipt and retransmission by the MSC 118, without the need for the SMSC 128.

The request transmitted by the communication unit 110 includes the dispatch ID of the requesting communication unit 110 and either the dispatch ID of a stationary communication unit 111–114 or a dispatch ID associated with the group of stationary communication units 111–114. Upon receiving the request, the dispatch processor 101 selects an available stationary communication unit 111–114, if necessary, and transmits the dispatch ID of the requesting communication unit 110 and the status indicator indicating the communication unit's desire to retrieve a stored message to the voice mail system 103 over the control channel of the base site 107 serving the chosen stationary communication unit (e.g., communication unit 111). In addition, the dispatch processor 103 transmits traffic channel assignments to the requesting communication unit 110 and the chosen stationary communication unit 111 over their serving base site's respective control channels. Further, the dispatch processor 101 establishes a radio communication path between the requesting communication unit 110 and the chosen stationary communication unit 111 in a manner similar to the establishment of the radio communication path used to convey the voice mail message to the voice mail system 103, as described above.

Upon receiving the communication unit's dispatch ID and the status indicator, the voice mail system 103 preferably conveys a PTT message to the chosen stationary communication unit 111 to instruct the stationary communication unit 111 to obtain control of the traffic channel 126 previously assigned to it by the dispatch processor 101. The voice mail system 103 then transmits an authentication request (e.g., password request) to the requesting communication unit 110 followed by an EOT message that instructs the stationary communication unit 111 to relinquish control of the traffic channel 126. Upon receipt of the proper authentication from the requesting communication unit 110 (e.g., via dual tone multi-frequency (DTMF) signals), the voice mail system 103 determines the mailbox ID of the requesting communication unit 110 corresponding to the received dispatch ID, as described above, and the user of the requesting communication unit 110 retrieves the stored voice mail message from the voice mail system 103 through an exchange with the voice mail system 103 over the radio communication path. In a preferred embodiment, the exchange includes transmission of DTMF signals from the requesting communication unit 110 to the voice mail system 103 to perform message management (e.g., retrieving, saving, deleting, forwarding, replying to, etc.) of the stored message.

In an alternative embodiment, the user of the communication unit 110 having the voice mailbox might retrieve his or her message by initiating a telephone interconnect call and contacting the voice mail system 103 via the MSC 118 or the public switched telephone network (not shown). In this case, the communication unit 110 transmits a request for a telephone interconnect call to the BSC 116 via the serving base site 106. The BSC 116 then allocates a traffic channel 122 at the base site 106, allocates a resource (e.g., a digital signal processor (DSP)) at the BSC 116, and requests a telephone resource from the MSC 118 in accordance with known techniques. The telephone resource provides a communication link between the MSC 118 and the voice mail system 103. Once the telephone interconnect path is established between the radio communication unit 110 and the voice mail system 103, the user of the communication unit 110 retrieves the voice mail message via the telephone interconnect path in accordance with known techniques.

In yet another embodiment of the present invention, instead of converting the dispatch ID of the voice mail request originator (i.e., the original target communication unit 110) to a mailbox ID at the voice mail system 103, the dispatch processor 101 might query a lookup table, or other equivalent database, either within the dispatch processor 101 or external to the dispatch processor 101 (e.g., in the HLR 120), to determine the mailbox ID of the voice mail request originator 110 before transmitting the voice mail request to the selected stationary communication unit 111. In this case, upon obtaining the mailbox ID of the voice mail request originator 110, the dispatch processor 101 generates the voice mail call request message using the dispatch ID of the selected stationary communication unit 111 and the mailbox ID of the voice mail request originator 110. Upon receiving the voice mail call request, the voice mail system 103 simply retrieves the prompt message associated with the received mailbox ID and the procedure continues as described above until the voice mail message is stored at the voice mail system 103.

As described above, the present invention provides voice mail service in a dispatch radio communication system.

Such service is not presently available in existing dispatch systems. Thus, the present invention allows dispatch users to finally enjoy the benefits and conveniences of voice mail that millions of standard telephone and cellular telephone users enjoy today.

FIG. 2 illustrates a logic flow diagram 200 of steps executed to provide voice mail service in a dispatch radio communication system in accordance with a preferred embodiment of the present invention. The logic flow begins (201) when the dispatch processor receives (203) a request to communicate in a private call from a calling communication unit, wherein the request includes a dispatch identification of a target communication unit. The dispatch processor then determines (205) whether the target communication unit can participate in the private call. When the target communication unit can participate in the private call, the dispatch processor establishes (207) a radio communication path between the calling communication unit and the target communication unit to enable the two units to complete the desired call, and the logic flow ends (209). However, when the target communication unit cannot participate in the requested call, the dispatch processor determines (211) whether at least one communication unit of a hunt group of communication units coupled to a voice mail system is available to receive a voice mail message from the calling communication unit. When all communication units in the hunt group are busy (i.e., are presently engaged in calls as preferably indicated in a hunt group status lookup table contained in the dispatch processor) or are otherwise unavailable (e.g., due to being out of service or powered off), the dispatch processor transmits (213) a target unavailable message to the calling communication unit to inform the calling communication unit that the target communication unit is presently inaccessible and that a voice mail message cannot be left for the target communication unit at this time.

When at least one communication unit in the hunt group is available, the dispatch processor selects (215) an available communication unit of the group. The dispatch processor then transmits (217) a new request to communicate to the voice mail system via the selected communication unit of the group and establishes (217) a radio communication path between the calling communication unit and the selected communication unit coupled to the voice mail system. The new request to communicate identifies the target communication unit as the originator of the new request and identifies the selected communication unit as the target of the new request. In addition, the new request includes a status indicator (flag) that informs the voice mail system that a message is going to be stored at the voice mail system for a user of the original target communication unit (as opposed to indicating that a stored message is going to be retrieved from the voice mail system by the user of the original target communication unit).

Upon receiving the new request, the voice mail system determines (219) a mailbox ID for the original target unit based on its dispatch ID. This determination is preferably accomplished by consulting a lookup table at the voice mail system. Once the proper mailbox ID is determined, the voice mail system retrieves (221) a prompt signal or message from a first memory location associated with the mailbox ID. The voice mail system then transmits (223) the prompt signal or message to the calling unit via the selected communication unit and the established radio communication path and receives (225) any voice mail message transmitted by the calling communication unit responsive to the prompt signal. As described above, the voice mail system preferably conveys a PTT message to the selected communication unit to enable the prompt signal to be transmitted and conveys an EOT message to the selected communication unit to enable the voice mail message to be received. Upon receiving the voice mail message from the calling unit, the voice mail system stores (227) the voice mail message in a second memory location associated with the mailbox ID and the logic flow ends (209).

FIG. 3 illustrates a logic flow diagram 300 of steps executed to provide voice mail service in a dispatch radio communication system in accordance with an alternative embodiment of the present invention. The logic flow begins (301) when the dispatch processor receives (303) a request to communicate in a private call from a calling mobile communication unit, wherein the request includes a dispatch identification of a target mobile communication unit. The dispatch processor then determines (305) whether the target communication unit can participate in the private call. When the target communication unit can participate in the private call, the dispatch processor establishes (307) a communication path between the calling communication unit and the target communication unit to enable the two units to complete the desired call, and the logic flow ends (309). However, when the target communication unit cannot participate in the requested call, the dispatch processor queries (311) a lookup table, either within the dispatch processor or external to the dispatch processor (e.g., in an external location register), to determine a voice mailbox ID for the target communication unit based on the dispatch ID of the target communication unit.

Upon obtaining the appropriate mailbox ID, the dispatch processor transmits (313) a new request to communicate to the voice mail system via a stationary communication unit coupled to the voice mail system and establishes (313) a radio communication path between the calling communication unit and the voice mail system. The new request to communicate includes the mailbox ID of the original target communication unit, identifies the original target communication unit as the originator of the new request, and identifies the stationary communication unit as the target of the new request. In addition, the new request includes a status indicator that informs the voice mail system that a message is going to be stored at the voice mail system for a user of the original target communication unit.

Upon receiving the new request, the voice mail system either retrieves from memory or generates a user-independent prompt signal (e.g., a canned prompt message or a preset tone) or a user-specific prompt signal (e.g., a uniquely recorded prompt message) and transmits (315) the prompt signal to the calling unit via the stationary communication unit and the established radio communication path. The voice mail system then receives (317) any voice mail message transmitted by the calling communication unit responsive to the prompt signal, and stores (319) the received message in a memory location associated with the mailbox ID. The voice mail system retains the message in memory for a predetermined length of time or until the voice mail system receives (321) a request to retrieve the stored message. The request to retrieve the stored message may be received either via the stationary communication unit and the dispatch processor or via the PSTN. When the request is received via the stationary communication unit and the dispatch processor, the request includes the mailbox ID and a status indicator indicating that the owner of the mailbox desires to retrieve a stored message. When the request is received via the PSTN, the request need only specify the mailbox ID because the request was not conveyed as part of the dispatch portion of the system and, therefore, is presumed to be a request to retrieve a stored message. Upon receiving the retrieval request, the voice mail system retrieves the stored message from memory and transmits (323) the stored message to the requesting unit, thereby ending (309) the logic flow.

The present invention encompasses a method and apparatus for providing voice mail service in a dispatch radio communication system. With this invention, dispatch radio system users can now utilize voice mail to provide private audio messages to each other in the event that one user is not available or reachable when another user is attempting to make radio contact via a private dispatch call. By providing voice mail service in a dispatch system, the present invention provides dispatch system users accessibility to a critical system feature that is used extensively in standard and cellular telephone systems, but that, prior to the present invention, has kept dispatch system users at a communicational disadvantage.

While the present invention has been particularly shown and described with reference to particular embodiments thereof, it will be understood by those skilled in the art that various changes in form and details may be made therein without departing from the spirit and scope of the present invention.

We claim:

1. A method for providing voice mail service in a dispatch radio communication system, the method comprising the steps of:
   a) receiving, at a dispatch processor, a first request to communicate from a first communication unit, the first request to communicate including a dispatch identification for a second communication unit that is a target of a communication from the first communication unit;
   b) determining, by the dispatch processor, whether the second communication unit can participate in the communication; and
   c) when the second communication unit cannot participate in the communication, establishing, by the dispatch processor, a radio communication path between the first communication unit and a third communication unit that is coupled to a voice mail system to allow a user of the first communication unit to provide a voice mail message to the voice mail system for a user of the second communication unit.

2. The method of claim 1, wherein step (c) further comprises the step of transmitting, by the dispatch processor, a second request to communicate to the voice mail system via the third communication unit, the second request to communicate identifying the second communication unit as an originator of the second request to communicate.

3. The method of claim 2, further comprising the steps of:
   d) upon receiving the second request to communicate, transmitting, by the voice mail system, a prompt signal to the first communication unit via the radio communication path, the prompt signal informing the user of the first communication unit that the voice mail system has been contacted;
   e) responsive to the prompt signal, transmitting, by the first communication unit, the voice mail message to the voice mail system via the radio communication path; and
   f) storing, by the voice mail system, the voice mail message in a first memory location at the voice mail system that is associated with the second communication unit.

4. The method of claim 3, wherein the second request to communicate includes the dispatch identification of the second communication unit and wherein step (d) comprises the steps of:

d1) upon receiving the second request to communicate, determining a mailbox identification for the second communication unit at the voice mail system based on the dispatch identification of the second communication unit;

d2) retrieving the prompt signal from a second memory location at the voice mail system that is associated with the mailbox identification; and d3) transmitting the prompt signal to the first communication unit.

5. The method of claim 3, wherein step (d) comprises the steps of:

d1) upon receiving the second request to communicate, sending a push-to-talk message to the third communication unit to instruct the third communication unit to obtain control of a communication resource allocated by the dispatch processor to support transmissions over the radio communication path; and d2) transmitting the prompt signal to the first communication unit via the communication resource.

6. The method of claim 5, wherein step (d) further comprises the step of:

d3) subsequent to transmission of the prompt signal, sending an end of transmission message to the third communication unit to instruct the third communication unit to relinquish control of the communication resource.

7. The method of claim 3, further comprising the steps of:

g) transmitting, by the second communication unit, a third request to communicate to the dispatch processor, the third request to communicate including a dispatch identification associated with the third communication unit to identify the third communication unit as a target of a communication from the second communication unit;

h) establishing, by the dispatch processor, a second radio communication path between the second communication unit and the third communication unit; and i) retrieving, by the second communication unit, the voice mail message from the first memory location at the voice mail system via the second radio communication path.

8. The method of claim 2, wherein step (c) further comprises the step of:

c1) prior to the step of transmitting the second request to communicate, querying a lookup table within the dispatch processor to determine a mailbox identification of the second communication unit at the voice mail system for inclusion in the second request to communicate.

9. The method of claim 2, wherein step (c) further comprises the step of:

c1) prior to the step of transmitting the second request to communicate, querying a lookup table external to the dispatch processor to determine a mailbox identification of the second communication unit at the voice mail system for inclusion in the second request to communicate.

10. The method of claim 2, wherein the first request to communicate further includes a dispatch identification of the first communication unit to identify the first communication unit as an originator of the first request to communicate, and wherein the second request to communicate further includes a dispatch identification of the third communication unit to identify the third communication unit as a target of the second request to communicate.

11. The method of claim 2, wherein the second request to communicate further includes a status indicator that indicates whether a voice mail message is to be stored at the voice mail system.

12. The method of claim 11, wherein the status indicator indicates whether a stored voice mail message is to be retrieved from the voice mail system.

13. The method of claim 1, wherein a group of communication units are coupled to the voice mail system, and wherein step (c) further comprises the steps of:

prior to the step of establishing the radio communication path, c1) determining whether at least one communication unit of the group of communication units is available to receive the voice mail message;

c2) when at least one communication unit of the group of communication units is available to receive the voice mail message, selecting an available communication unit of the group of communication units as the third communication unit.

14. A method for providing voice mail service in a dispatch radio communication system, the method comprising the steps of:

a) receiving, at a dispatch processor, a first request to communicate from a first communication unit, the first request to communicate including a dispatch identification for a second communication unit that is a target of a communication from the first communication unit;

b) determining, by the dispatch processor, whether the second communication unit can participate in the communication with the first communication unit;

c) when the second communication unit cannot participate in the communication with the first communication unit, 1) determining, by the dispatch processor, whether at least one communication unit of a group of communication units coupled to a voice mail system is available to receive a voice mail message;

2) when at least one communication unit of the group of communication units is available to receive the voice mail message, i) selecting, by the dispatch processor, an available communication unit of the group of communication units as a third communication unit;

ii) transmitting, by the dispatch processor, a second request to communicate to the voice mail system via the third communication unit, the second request to communicate including the dispatch identification of the second communication unit to identify the second communication unit as an originator of the second request to communicate and indicating that a voice mail message is to be stored at the voice mail system;

iii) establishing, by the dispatch processor, a radio communication path between the first communication unit and the third communication unit;

iv) upon receiving the second request to communicate, determining, by the voice mail system, a mailbox identification for the second communication unit at the voice mail system based on the dispatch identification of the second communication unit;

v) retrieving, by the voice mail system, a prompt signal from a first memory location at the voice mail system that is associated with the mailbox identification of the second communication unit;

vi) transmitting, by the voice mail system, the prompt signal to the first communication unit via the radio communication path, the prompt signal informing a user of the first communication unit that the voice mail system has been contacted;

vii) responsive to the prompt signal, transmitting, by the first communication unit, the voice mail message to the voice mail system via the radio communication path; and viii) storing, by the voice mail system, the voice mail message in a second memory location at the voice mail system that is associated with the mailbox identification of the second communication unit.

15. A method for a dispatch processor to facilitate voice mail service in a dispatch radio communication system, the method comprising the steps of:

a) receiving a first request to communicate from a first radio communication unit, the first request to communicate including a dispatch identification for a second radio communication unit that is a target of a communication from the first radio communication unit;

b) determining whether the second radio communication unit can participate in a communication with the first radio communication unit;

c) when the second radio communication unit cannot participate in the communication, 1) transmitting a second request to communicate to a voice mail system via a third radio communication unit that is coupled to the voice mail system, the second request to communicate identifying the second communication unit as an originator of the second request to communicate;

2) receiving, responsive to the second request to communicate, a prompt signal from the voice mail system via the third radio communication unit;

3) transmitting the prompt signal to the first radio communication unit, the prompt signal informing a user of the first radio communication unit that the voice mail system has been contacted;

4) receiving, responsive to the prompt signal, a message to be stored at the voice mail system from the first radio communication unit; and 5) transmitting the message to the voice mail system via the third radio communication unit.

16. The method of claim 15, wherein step (c1) further comprises the step of:

c1a) prior to the step of transmitting the second request to communicate, querying a lookup table within the dispatch processor to determine a mailbox identification of the second radio communication unit at the voice mail system for inclusion in the second request to communicate.

17. The method of claim 15, wherein step (c1) further comprises the steps of:

c1a) prior to the step of transmitting the second request to communicate, querying a lookup table external to the dispatch processor to determine a mailbox identification of the second radio communication unit at the voice mail system for inclusion in the second request to communicate.

18. The method of claim 15, wherein a group of communication units are coupled to the voice mail system, and wherein step (c1) further comprises the steps of:

prior to the step of transmitting the second request to communicate, c1a) determining whether at least one communication unit of the group of communication units is available to receive the message; and c1b) when at least one communication unit of the group of communication units is available to receive the message, selecting an available communication unit of the group of communication units as the third radio communication unit.

19. A method for a voice mail system to provide voice mail service in a dispatch radio communication system, the method comprising the steps of:

a) receiving, from a dispatch processor, a request to communicate via a first radio communication unit that is coupled to the voice mail system, the request to communicate including an identification of a second radio communication unit;

b) transmitting, responsive to the request to communicate, a prompt signal to a third radio communication unit via the first radio communication unit and the dispatch processor, the prompt signal informing a user of the third radio communication unit that the voice mail system has been contacted;

c) receiving, responsive to transmission of the prompt signal, a message from the third radio communication unit via the dispatch processor and the first radio communication unit; and d) storing the message in a first memory location at the voice mail system that is associated with the identification of the second radio communication unit.

20. The method of claim 19, wherein the identification of the second radio communication unit is a dispatch identification of the second radio communication unit and wherein step (b) further comprises the steps of:

prior to the step of transmitting the prompt signal, b1) determining a mailbox identification for the second radio communication unit at the voice mail system based on the dispatch identification of the second radio communication unit; and b2) retrieving the prompt signal from a second memory location at the voice mail system that is associated with the mailbox identification of second radio communication unit.

21. The method of claim 20, wherein step (d) comprises the step of storing the message in a first memory location at the voice mail system that is associated with the mailbox identification of the second radio communication unit.

22. The method of claim 19, wherein step (b) comprises the steps of:

b1) sending, responsive to the request to communicate, a push-to-talk message to the first radio communication unit to instruct the first radio communication unit to obtain control of a communication resource allocated by the dispatch processor to support transmissions between the voice mail system and the third radio communication unit; and b2) transmitting the prompt signal to the third radio communication unit via the communication resource.

23. The method of claim 22, wherein step (b) further comprises the step of:

b3) subsequent to transmission of the prompt signal, sending an end of transmission message to the first radio communication unit to instruct the first radio communication unit to relinquish control of the communication resource.

24. The method of claim 19, further comprising the steps of:

e) receiving, from the second radio communication unit, a request to retrieve the message stored in the first memory location; and f) transmitting, responsive to the request to retrieve, the message to the second radio communication unit via the first radio communication unit and the dispatch processor.

25. A dispatch communication system that provides voice mail service, comprising:

a stationary communication unit;

a dispatch processor, the dispatch processor supporting dispatch communications between mobile communication units and, when a dispatch communication of an originating mobile communication unit cannot be completed to a target mobile communication unit, establishing a radio communication path between the originating mobile communication unit and the stationary communication unit; and a voice mail system, coupled to the stationary communication unit, the voice mail system controlling operation of the stationary communication unit to enable the voice mail system to receive a voice mail message from the originating mobile communication unit via the radio communication path for storage in a memory location at the voice mail system that is associated with an identification of the target mobile communication unit.

26. The dispatch communication system of claim 25, wherein the stationary communication unit is one of a plurality of stationary communication units coupled to, and controlled by, the voice mail system.

27. The dispatch communication system of claim 25, further comprising:

a location register, coupled to the dispatch processor, that is queried by the dispatch processor to determine the identification of the target mobile communication unit for subsequent transmission to the voice mail system.

* * * * *